United States Patent
Kawai et al.

(10) Patent No.: US 8,504,612 B2
(45) Date of Patent: Aug. 6, 2013

(54) IMAGE FORMING SYSTEM, IMAGE FORMING APPARATUS, AND IMAGE FORMING METHOD FOR THE DEVELOPMENT, DISTRIBUTION, AND MAINTENANCE OF IMAGE FORMING APPARATUS OPERATION SCREENS

(75) Inventors: Takanao Kawai, Osaka (JP); Takashi Araki, Osaka (JP)

(73) Assignee: KYOCERA Document Solutions Inc. (JP)

( * ) Notice: Subject to any disclaimer, the term of this patent is extended or adjusted under 35 U.S.C. 154(b) by 359 days.

(21) Appl. No.: 12/967,656

(22) Filed: Dec. 14, 2010

(65) Prior Publication Data
US 2011/0153729 A1   Jun. 23, 2011

(30) Foreign Application Priority Data

Dec. 22, 2009 (JP) ................... 2009-290088
Dec. 22, 2009 (JP) ................... 2009-290089

(51) Int. Cl.
*G06F 15/16* (2006.01)

(52) U.S. Cl.
USPC ........................................... 709/203

(58) Field of Classification Search
USPC .................. 709/201, 203, 217, 220, 223
See application file for complete search history.

(56) References Cited

U.S. PATENT DOCUMENTS

2006/0070087 A1 * 3/2006 Ando et al. .................. 719/320
2010/0309502 A1   12/2010 Ando et al.

FOREIGN PATENT DOCUMENTS

| JP | 2002-152446 | 5/2002 |
| JP | 2004-185553 | 7/2004 |
| JP | 2004-185594 | 7/2004 |
| JP | 2005-321944 | 11/2005 |
| JP | 2005321944 A * | 11/2005 |
| JP | 2006-109411 | 4/2006 |
| JP | 2007-300334 | 11/2007 |
| JP | 2008-186160 | 8/2008 |
| JP | 2008-210394 | 9/2008 |

* cited by examiner

*Primary Examiner* — Larry Donaghue
*Assistant Examiner* — Marshall McLeod
(74) *Attorney, Agent, or Firm* — McDonnell Boehnen Hulbert & Berghoff LLP

(57) ABSTRACT

A web browser of a multifunction peripheral transmits a request for screen data to a web server and causes an operation screen to be displayed on an operation panel on the basis of the screen data. A terminal-side web browser of a terminal apparatus transmits a request for screen data to the web server and causes an operation screen to be displayed on a display of the terminal apparatus on the basis of the screen data. Also, the web server transmits first screen data to the terminal-side web browser in response to a request from the terminal-side web browser, the first screen data being generated from basic screen data, and transmits second screen data to the web browser in response to a request from the web browser, the second screen data being generated from the basic screen data.

13 Claims, 7 Drawing Sheets

```
<screen>
  <frame id=1 title="test application">
    <button type=SimpleButton actionId=act1
      label="push it" x=20 y=80 width=60 height=20></button>
    <image id=Icon1 x=10 y=10 width=80 height=60></image>
  </frame>
</screen>
```

IMAGE FORMING SYSTEM, IMAGE FORMING APPARATUS, AND IMAGE FORMING METHOD FOR THE DEVELOPMENT, DISTRIBUTION, AND MAINTENANCE OF IMAGE FORMING APPARATUS OPERATION SCREENS

REFERENCE TO RELATED APPLICATIONS

This application is based upon and claims the benefit of priority from corresponding Japanese Patent Application Nos. 2009-290088 and 2009-290089, both filed in the Japan Patent Office on Dec. 22, 2009, the entire contents of both of which are incorporated herein by reference.

BACKGROUND

1. Field of the Invention

The present invention relates to an image forming system, an image forming apparatus, and an image forming method.

2. Description of the Related Art

Image forming apparatuses, such as copying machines, printers, and multifunction peripherals (MFPs), may include an application that performs a process such as printing or copying to operate on a platform, such as a Java (registered trademark) virtual machine. The application performs various processes using internal devices of the image forming apparatus.

The application causes an operation screen to be displayed on an operation panel of the image forming apparatus and accepts a user operation. By adding or changing an application, the user can easily customize the operation screen. Also, an image forming apparatus is known in which an operation screen is displayed on the basis of screen data that describes a screen structure in an Extensible Markup Language (XML).

A driver of an image forming apparatus is installed in a host apparatus coupled to the image forming apparatus, which enables the host apparatus to control the image forming apparatus. The driver causes the host apparatus to display an operation screen for operating the image forming apparatus. A user inputs instructions via the operation screen to perform various operations that cause the image forming apparatus to operate accordingly. Furthermore, if the image forming apparatus has an operation panel, the user operates the operation panel of the image forming apparatus to cause the image forming apparatus to operate.

In the above-described manner, the user inputs instructions to perform various operations to the operation screen of the driver in the host apparatus to indirectly cause the image forming apparatus to operate, and also operates the operation panel of the image forming apparatus to directly cause the image forming apparatus to operate.

Therefore, when a function of the image forming apparatus is available from both the operation panel of the image forming apparatus and the driver in the host apparatus, it is necessary to install program code for using the function from the operation panel and screen data for an operation screen in the image forming apparatus, and to install program code for using the function from the driver and screen data for an operation screen in the host apparatus. Thus, the screen data for the operation panel of the image forming apparatus and the screen data for the host apparatus are developed and installed independently from each other in many cases. However, when an identical function is used, pieces of information provided on both operation screens are similar to each other, and thus development operations for developing pieces of screen data of those operation screens overlap each other.

SUMMARY

The present disclosure relates to an image forming system, an image forming apparatus, and an image forming method that increase efficiency of developing screen data for an operation screen on an operation panel of the image forming apparatus and an operation screen of a host apparatus.

An image forming system according to an aspect of the present disclosure includes an image forming apparatus and a terminal apparatus coupled to a network. The terminal apparatus includes a terminal-side web browser configured to transmit a request for screen data to a web server at the image forming apparatus, receive the screen data, and cause an operation screen for using a function of the image forming apparatus to be displayed on a display of the terminal apparatus on the basis of the received screen data. The image forming apparatus includes the web server and a web browser configured to transmit a request for screen data to the web server, receive the screen data, and cause an operation screen for using the function of the image forming apparatus to be displayed on a display device of the image forming apparatus on the basis of the received screen data. The web server transmits screen data to the terminal-side web browser in response to the request for the screen data from the terminal-side web browser, the screen data being generated for the terminal-side web browser from basic screen data corresponding to the function, and transmits screen data to the web browser in response to the request for the screen data from the web browser, the screen data being generated for the web browser from the basic screen data corresponding to the function.

An image forming apparatus according to an aspect of the present disclosure communicates with a terminal apparatus via a network, and includes a web server and a web browser configured to transmit a request for screen data to the web server, receive the screen data, and cause an operation screen for using a function of the image forming apparatus to be displayed on a display of the image forming apparatus on the basis of the received screen data. The terminal apparatus includes a terminal-side web browser configured to transmit a request for screen data to the web server, receive the screen data, and cause an operation screen for using the function of the image forming apparatus to be displayed on a display of the terminal apparatus on the basis of the received screen data. The web server transmits first screen data to the terminal-side web browser in response to the request for the screen data from the terminal-side web browser, the first screen data being generated for the terminal-side web browser from basic screen data corresponding to the function, and transmits second screen data to the web browser in response to the request for the screen data from the web browser, the second screen data being generated for the web browser from the basic screen data corresponding to the function.

An image forming method according to an aspect of the present disclosure includes: transmitting, via a terminal-side web browser of a terminal apparatus coupled to a network, a request for screen data to a web server of an image forming apparatus coupled to the network; transmitting, via the web server of the image forming apparatus, screen data to the terminal-side web browser in response to the request for the screen data from the terminal-side web browser, the screen data being generated for the terminal-side web browser from basic screen data corresponding to a function of the image forming apparatus; receiving, via the terminal-side web browser, the screen data, and causing an operation screen for using the function of the image forming apparatus to be displayed on a display device of the terminal apparatus on the basis of the received screen data; transmitting, via a web browser of the image forming apparatus, a request for screen data to the web server of the image forming apparatus; transmitting, via the web server of the image forming apparatus, screen data to the web browser of the image forming apparatus in response to the request for the screen data from the web browser of the image forming apparatus, the screen data being generated for the web browser of the image forming apparatus from the basic screen data corresponding to the function; and receiving, via the web browser of the image forming apparatus, the screen data, and causing an operation screen for using the function of the image forming apparatus to be displayed on a display device of the image forming apparatus on the basis of the received screen data.

DETAILED DESCRIPTION

Figure 1:
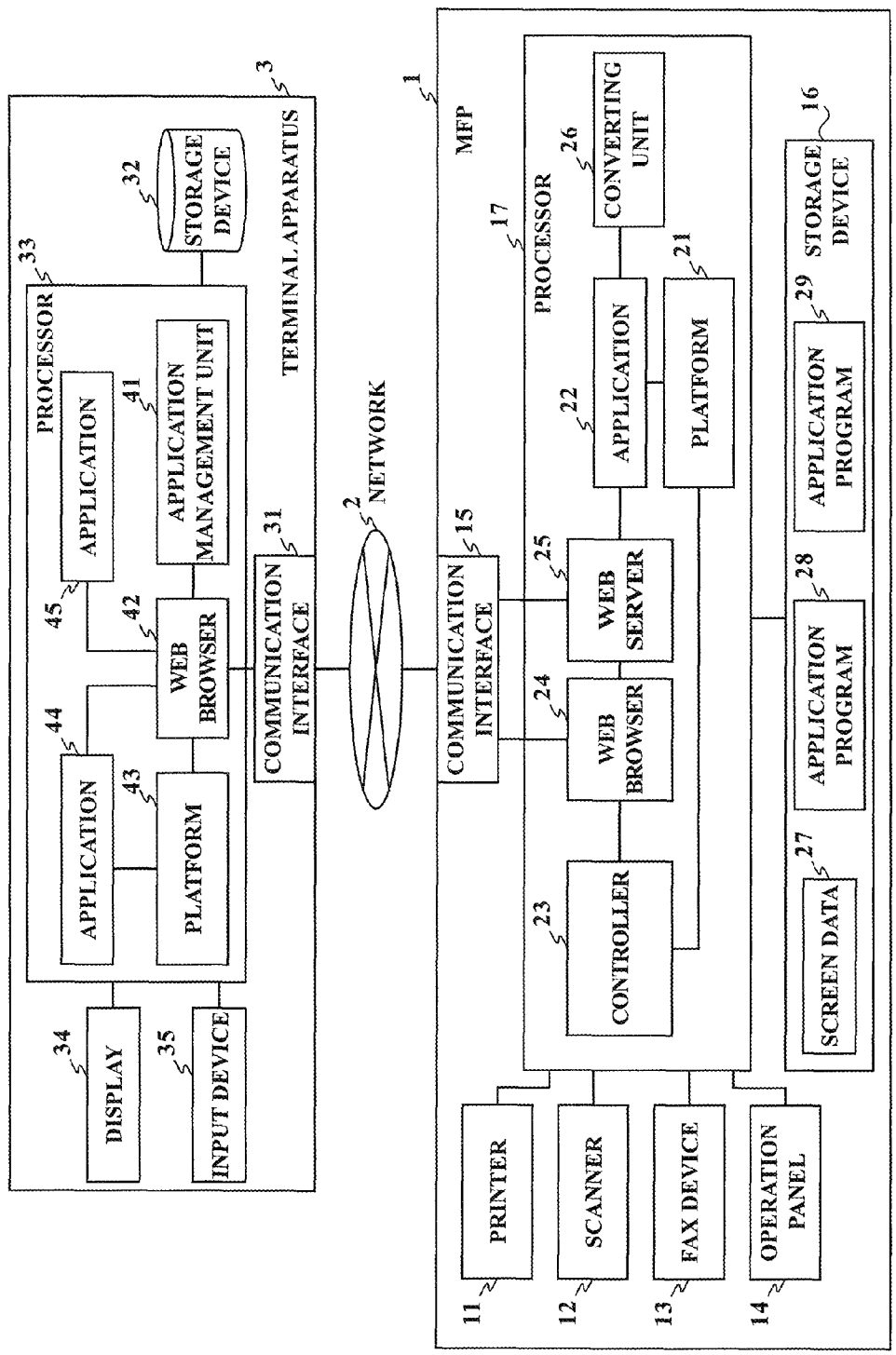
FIG. 1 is a block diagram illustrating a configuration of an image forming system according to an embodiment of the present disclosure.

FIG. 1 is a block diagram illustrating a configuration of an image forming system according to an embodiment of the present disclosure. In this image forming system, an MFP 1 (example of an image forming apparatus) is coupled to a network 2, and a terminal apparatus 3 (example of a host apparatus) is coupled to the network 2. The network 2 may be a local area network (LAN), such as an intranet, and/or a wide area network (WAN), such as the Internet.

The MFP 1 may include a printer 11, a scanner 12, a facsimile (FAX) device 13, an operation panel 14, a communication interface 15, a storage device 16, and/or a processor 17.

The printer 11 prints a document image on the basis of print data. The scanner 12 optically reads a document image from a document and generates image data of the document. The FAX device 13 generates a facsimile signal from document data (such as the image data from the scanner) and transmits the generated facsimile signal, and also receives a facsimile signal and converts it into document data.

The operation panel 14 is placed on an outer casing of the MFP 1 and includes a display for displaying various pieces of information to a user and an input device for detecting a user operation. The display may include a liquid crystal display, for example. The input device may include key switches and/or a touch panel, for example.

The communication interface 15 is coupled to the network 2 and communicates with the terminal apparatus 3 via the network 2. The communication interface 15 may include a network interface and/or a modem, for example.

The storage device 16 stores various programs and various pieces of data. The storage device 16 may include a hard disk drive and/or a nonvolatile storage medium, such as a nonvolatile memory.

The storage device 16 stores programs and data that may be necessary for operation of the MFP 1, and also stores screen data 27 used for displaying an operation screen on the display of the operation panel 14, an application program 28 for the MFP 1, and an application program 29 for the terminal apparatus 3. The application programs 28 and 29 may be Java (registered trademark) program applications. The screen data 27 may be described in a markup language, such as Extensible Markup Language (XML). Screen data that can be interpreted on a web browser is generated from the screen data 27. The screen data 27 may include data described in a markup language, such as HyperText Markup Language (HTML), and a script described in a script language, such as JavaScript. Also, the screen data 27 may include the data described in the HTML, the script, and/or a cascading style sheet. The screen data 27 used in the application program 28 may be stored in the storage device 16 together with the application program 28 at the time of installation. At the execution of the application program 28, the screen data 27 may be loaded from the storage device 16 to a RAM in the processor 17 so that the screen data 27 can be read at high speed when it is necessary.

The processor 17 may include a central processing unit (CPU), a read only memory (ROM), a random access memory (RAM), etc. A program may be loaded from the storage device 16 or the like to the RAM and is executed by the CPU, which realizes various processing units.

After startup of the MFP 1, a program (not illustrated) stored in the storage device 16 is executed by the processor 17. The processor 17 and the program may realize an operating system (not illustrated), a platform 21, an application 22, a controller 23, a web browser 24, a web server 25, and/or a converting unit 26, among other possibilities. Sections for controlling the operation panel 14 in the web browser 24 and the controller 23 may be mounted on a first processing board (not illustrated), and the platform 21, the application 22, the remaining section of the controller 23, the web server 25, and the converting unit 26 may be mounted on a second processing board (not illustrated). Each of the first processing board and the second processing board includes a CPU, a ROM, and a RAM, loads a program from the storage device 16 or the like to the RAM, and executes the program with the CPU, which realizes various processing units. Data communication between the first processing board and the second processing board may be performed using an interface.

The platform 21 executes an application. In this embodiment, the platform 21 is a Java virtual machine that executes a Java application.

The application 22 is formed through execution of the application program 28 on the platform 21. The application 22 causes the controller 23 to execute an operation specified by a process execution instruction via a controller application program interface (API). The controller 23 causes the printer 11, the scanner 12, the FAX device 13, and/or the operation panel 14 to execute the operation specified by the process execution instruction. The application 22 may also operate on document data in a user's document box provided in the storage device 16. For example, the application 22 may cause a list of document data in the document box or an image of the document data to be displayed.

The controller 23 controls the printer 11, the scanner 12, the FAX device 13, and/or the operation panel 14, and receives data from/transmits data to those devices. The controller API is loaded in order to use the controller 23. The controller API causes the controller 23 to operate in accordance with an instruction provided from an application that operates on the platform 21 when causing the controller 23 to execute the functions of the printer 11, the scanner 12, the FAX device 13, and the operation panel 14, or to receive data from/transmit data to those devices.

The web browser 24 has a web client function for communicating with the web server 25 using a Hypertext Transfer Protocol (HTTP) and a screen display function for displaying an operation screen on the basis of the screen data 27 described in a markup language. The web browser 24 may be a web browser for an embedded system.

The application 22 causes the web browser 24 to display an operation screen on the display of the operation panel 14 on the basis of the screen data 27. At that time, the web browser 24 causes the controller 23 to display the operation screen on the display of the operation panel 14. The operation screen has an operation unit including operation buttons, which are used by a user to operate the MFP 1 and/or input settings.

The web server 25 communicates with a web client, such as a web browser, using HTTP, and receives an HTTP command from the web client. The web server 25 receives an HTTP command from the web browser 24, and also receives an HTTP command transmitted from a web browser 42 of the terminal apparatus 3 via the communication interface 15.

If the types of markup languages (HTML, XML, or the like) and script languages interpreted by the web browser 24 of the MFP 1 and the web browser 42 of the terminal apparatus 3 are different from each other, first screen data described in a markup language and a script language interpreted by the web browser 24 of the MFP 1 and second screen data described in a markup language and a script language interpreted by the web browser 42 of the terminal apparatus 3 are generated from the screen data 27 as a piece of data. The web server 25 transmits the first screen data to the web browser 24 and transmits the second screen data to the web browser 42. Since the first screen data and the second screen data are automatically generated from the screen data 27, the operation screen of the MFP 1 and the operation screen of the terminal apparatus 3 are displayed on the basis of the screen data 27 as a single piece of data. The web server 25 may transmit identical screen data 27 to the web browser 24 and the web browser 42. Alternatively, cascading style sheets that are applied to the screen data 27, and that are different from each other, may be separately transmitted to the web browser 24 and the web browser 42, respectively.

The converting unit 26 generates screen data for the web browser 24 of the MFP 1 and screen data for the web browser 42 of the terminal apparatus 3 from the screen data 27 (hereinafter referred to as basic screen data) that is stored in the storage device 16 or the like of the MFP 1.

The terminal apparatus 3 may be a personal computer, a mobile terminal apparatus, or the like. The terminal apparatus 3 includes a communication interface 31, a storage device 32, a processor 33, a display 34, and an input device 35.

The communication interface 31 is connectable to the network 2 and communicates with the MFP 1. The communication interface 31 may include a network interface and/or a modem.

The storage device 32 stores various programs and various pieces of data. The storage device 32 may include a hard disk drive and/or a nonvolatile storage medium, such as a nonvolatile memory.

The processor 33 may include a CPU, a ROM, a RAM, etc. A program may be loaded from the storage device 32 or the like to the RAM and is executed by the CPU, which realizes various processing units.

After startup of the terminal apparatus 3, a program (not illustrated) stored in the storage device 32 is executed by the processor 33. The processor 33 and the program may realize an operating system (not illustrated), an application management unit 41, the web browser 42, and/or a platform 43, among other possibilities.

The application management unit 41 downloads the application program 29 for the terminal apparatus 3 from the MFP 1 and causes a terminal-side application 44 and/or 45 based on the application program 29 to operate.

The web browser 42 communicates with the web server 25 of the MFP 1 using HTTP and causes an operation screen to be displayed on the display 34 on the basis of screen data described in a markup language. The web browser 42 may be a general-purpose web browser.

The platform 43 executes the application 44 on the basis of the application program 29 downloaded from the MFP 1. The platform 43 may include a Java virtual machine that executes a Java application. It should be noted that the downloaded application program 29 may be executed as the application 45 without using the platform 43.

Figure 2:
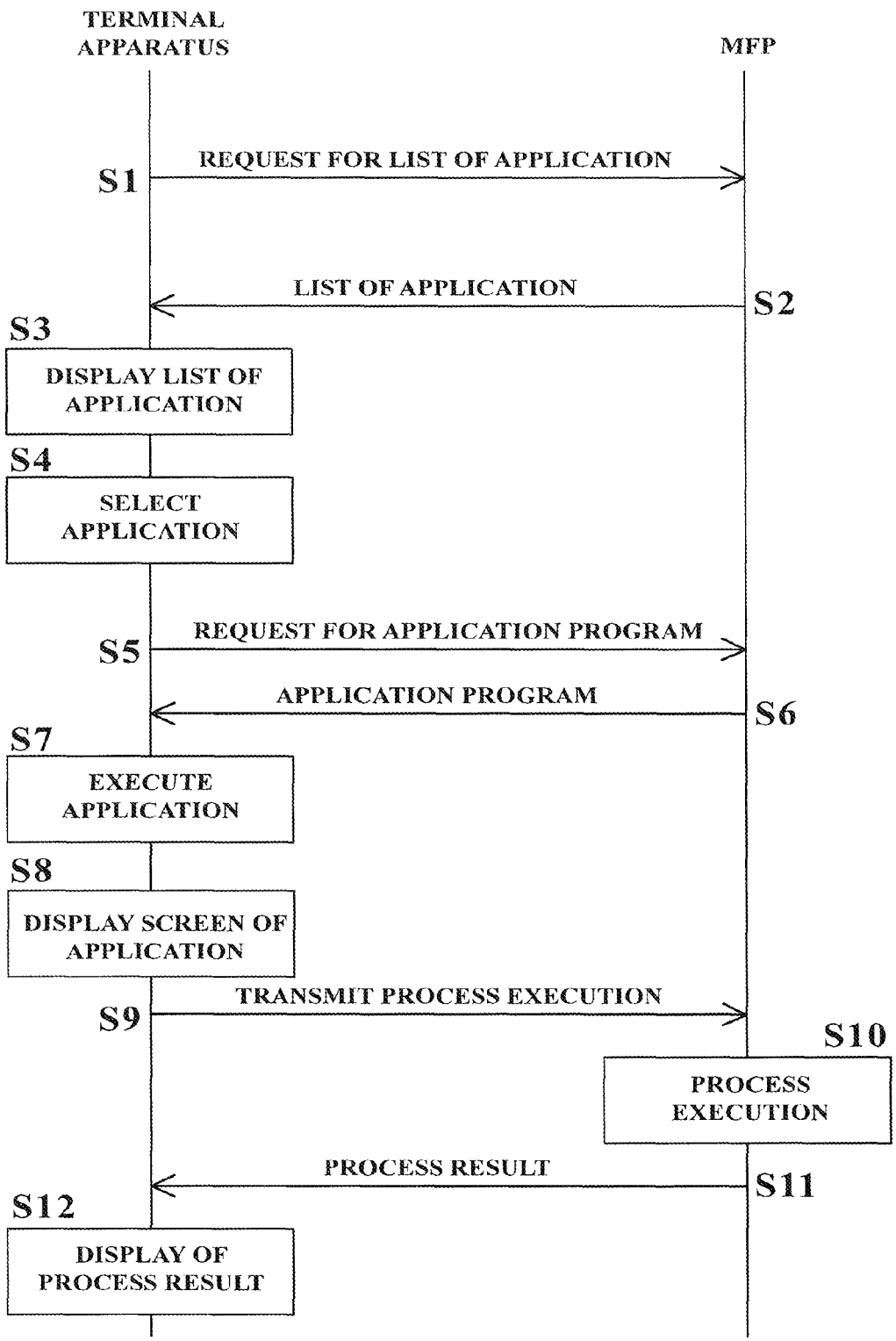
FIG. 2 is a sequence diagram for explaining an operation of a terminal apparatus downloading an application program from an MFP and executing the application program.

FIG. 2 is a sequence diagram for explaining an operation of the terminal apparatus 3 downloading the application program 29 from the MFP 1 and executing it.

In the terminal apparatus 3, after start up, the application management unit 41 transmits a request for screen data of an application list to the web server 25 of the MFP 1 by specifying a predetermined uniform resource locator (URL) using the web browser 42 (step S1). In the MFP 1, the web server 25 receives the request and transmits screen data including a list of application programs 29 for the terminal apparatus 3 (e.g., an HTML file) to the terminal apparatus 3 (step S2). The web browser 42 of the terminal apparatus 3 receives the screen data and causes an operation screen including the list of the application programs 29 to be displayed on the display 34 (step S3).

Figure 3:
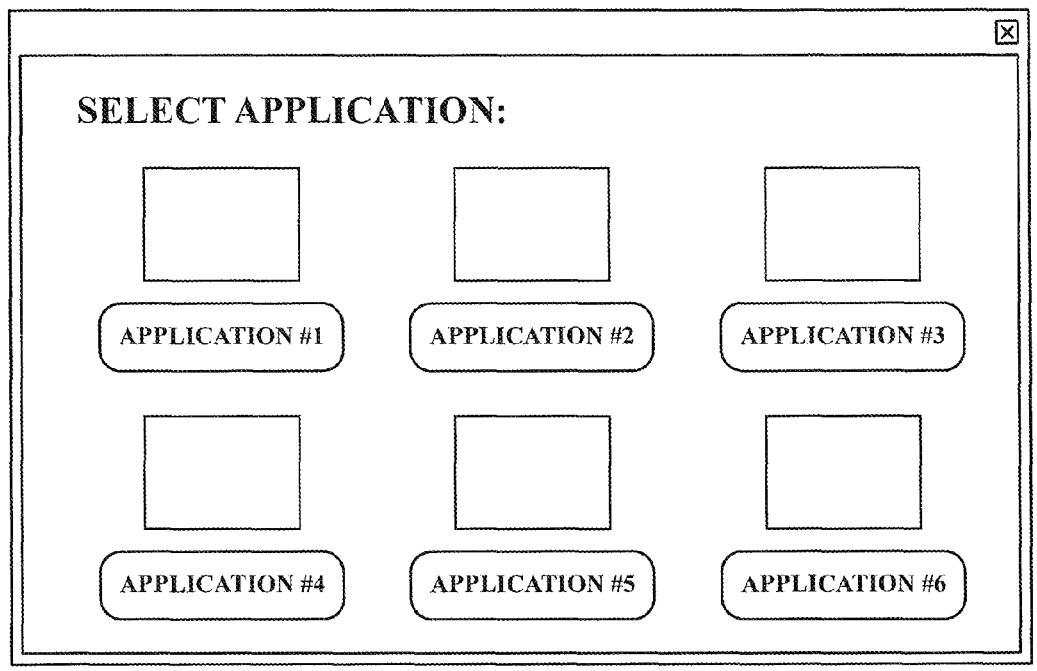
FIG. 3 is a diagram illustrating a display example of an application list showing application programs that can be downloaded from an MFP to a terminal apparatus.

FIG. 3 is a diagram illustrating a display example of an application list showing application programs that can be downloaded from the MFP 1 to the terminal apparatus 3. On the operation screen illustrated in FIG. 3, icon images and selection buttons corresponding to individual application programs 29 are displayed. When the input device 35 is operated and one of the selection buttons is pressed (step S4), the web browser 42 specifies the URL of the application program 29 corresponding to the selection button in accordance with the screen data and transmits a request for the application program 29 to the web server 25 (step S5).

In the MFP 1, the web server 25 receives the request and transmits the requested application program 29 to the terminal apparatus 3 (step S6). The web browser 42 of the terminal apparatus 3 receives the application program 29 and executes it (step S7). Alternatively or additionally, the application program 29 for the terminal apparatus 3 may be stored in a server (not illustrated) coupled to the network 2, may be downloaded from the server and temporarily stored in the storage device 16 or the RAM in the processor 17, and then may be transmitted to the terminal apparatus 3.

If the application program 29 is a specific type of application program (e.g., a Java application or other run-time application), the application program 29 is executed as the application 44 on the platform 43. Otherwise, the application program 29 may be executed as the application 45 of a native program by the processor 33.

The application 44 or 45 downloads screen data of an operation screen from the web server 25 of the MFP 1 using the web browser 42 and causes the operation screen to be displayed on the display 34 (step S8).

Figure 4:
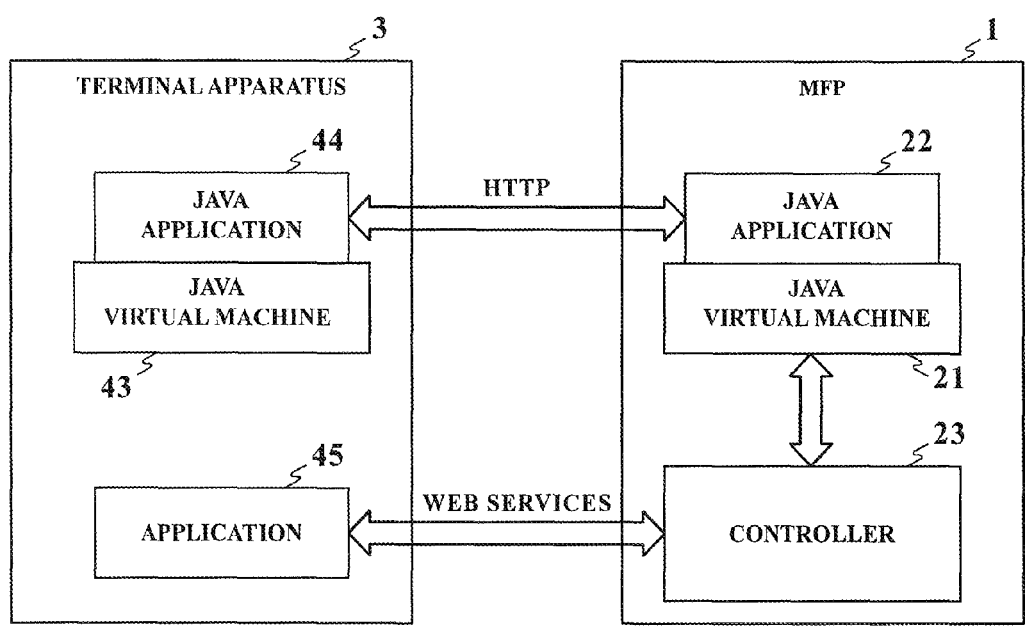
FIG. 4 is a diagram for explaining communications between the MFP and a terminal apparatus.

The application 44 or 45 communicates with the MFP 1 using the web browser 42 and uses a function of the MFP 1. FIG. 4 is a diagram for explaining communications between the MFP 1 and an application based on the application program that is downloaded from the MFP 1 to the terminal apparatus 3 in the system illustrated in FIG. 1.

In one embodiment, the application 44, that operates on the platform 43, communicates with the application 22 of the MFP 1 via the web server 25 using the web browser 42, and transmits a process execution instruction corresponding to a user operation detected by the input device 35 to the application 22 of the MFP 1 (step S9 of FIG. 2). The application 22 receives the process execution instruction and executes a process specified by the process execution instruction (step S10 of FIG. 2). The process result is transmitted from the application 22 to the application 44 (step S11 of FIG. 2). The application 44 causes the process result to be displayed on the operation screen (step S12 of FIG. 2).

In another embodiment, the application 45, which operates as a native program, communicates with the controller 23 of the MFP 1 via the web server 25 using the web browser 42, and transmits a process execution instruction corresponding to a user operation detected by the input device 35 to the controller 23 of the MFP 1 (step S9 of FIG. 2). The controller 23 receives the process execution instruction and executes a process specified by the process execution instruction (step S10 of FIG. 2). The process result is transmitted from the controller 23 to the application 45 (step S11 of FIG. 2). The application 45 causes the process result to be displayed on the operation screen (step S12 of FIG. 2). The communication between the application 45 and the controller 23 is performed via HTTP using a communication protocol (for example, a Web Services Description Language (WSDL)). The communications between the application 45 and the controller 23 include transmission and reception of the process execution instruction and the process result.

Accordingly, a process execution instruction can be obtained from both the MFP 1 and the terminal apparatus 3 using HTTP, and an operation screen can be displayed using a web browser in both the MFP 1 and the terminal apparatus 3, which increases the development efficiency of program code for using the function of the MFP 1 from the terminal apparatus 3 and screen data for an operation screen. Furthermore, it is not necessary to install an application program in the terminal apparatus 3 using an installer.

Figure 5:
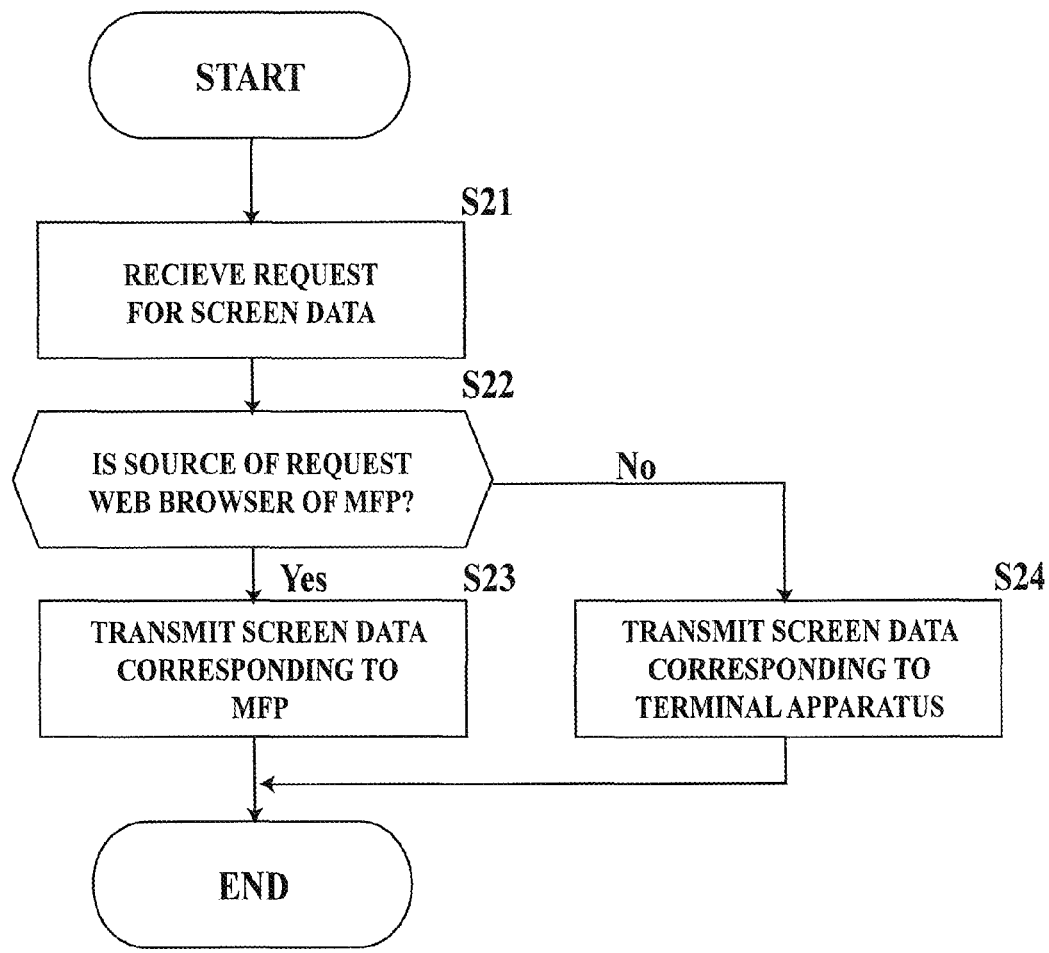
FIG. 5 is a flowchart for explaining a process of displaying operation screens in the MFP and the terminal apparatus.

FIG. 5 is a flowchart for explaining a process of displaying operation screens in the MFP 1 and the terminal apparatus 3.

When a user logs into the MFP 1, a basic menu is first displayed on the operation panel 14. When one of functions that are selectable in the basic menu is selected through a user operation, the web browser 24 transmits a request for screen data of an operation screen of the function to the web server 25. The application 44 or 45 starts up in the terminal apparatus 3, the application 44 or 45 causes an initial screen to be displayed on the web browser 42, and a certain function is selected on the initial screen through a user operation. Then, the web browser 42 transmits a request for screen data of an operation screen of the selected function to the web server 25. In this way, a request for screen data is transmitted to the web server 25 from the web browser 24 of the MFP 1 or the web browser 42 of the terminal apparatus 3. The web server 25 receives the request for the screen data from the web browser 24 of the MFP 1 or the web browser 42 of the terminal apparatus 3 (step S21). The request for the screen data may be transmitted and received as an HTTP command.

If the request for the screen data is from the web browser 24 of the MFP 1 (YES in step S22), the web server 25 transmits screen data for the web browser 24 of the MFP 1 to the web browser 24 (step S23). On the other hand, if the request for the screen data is from the web browser 42 of the terminal apparatus 3 (NO in step S22), the web server 25 transmits screen data for the web browser 42 of the terminal apparatus 3 to the web browser 42 (step S24). The screen data to be transmitted is determined on the basis of an URL, a user agent information, or some other information included in the request for the screen data. At this time, when the request is received, the operation screen indicated by the request is specified by the converting unit 26, screen data to be transmitted is generated from the screen data 27 stored in the storage device 16, and the web server 25 transmits the generated screen data.

When the above-described function is to be executed by the application 22, the web server 25 transmits the request to the application 22 that executes the function. The application 22 determines, on the basis of the request, whether the source of the request is the web browser 24 of the MFP 1 or the web browser 42 of the terminal apparatus 3 (step S22), and transmits the screen data corresponding to the source via the web server 25 (step S23 or S24). When the application 22 receives the request, the screen data to be transmitted is generated from the screen data 27 stored in the storage device 16 by the converting unit 26, and the application 22 transmits the generated screen data via the web server 25.

Figure 6:
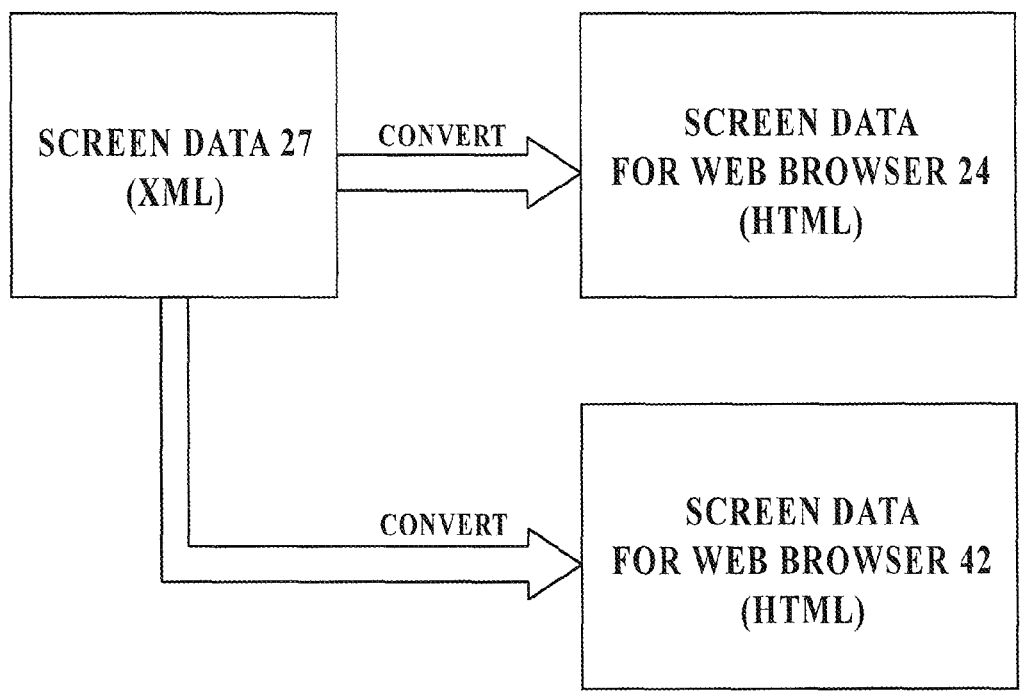
FIG. 6 is a diagram illustrating a relationship between screen data stored in the MFP, screen data for a web browser of the terminal apparatus, and screen data for a web browser of the MFP.

FIG. 6 is a diagram illustrating a relationship between the screen data 27 stored in the MFP 1, screen data for the web browser 42 of the terminal apparatus 3, and screen data for the web browser 24 of the MFP 1. The basic screen data 27 stored in the storage device 16 of the MFP 1 may be described in a markup language. The screen data for the web browser 42 of the terminal apparatus 3 and the screen data for the web browser 24 of the MFP 1, which are described in HTML, may be generated from the basic screen data 27. The basic screen data 27 is described in XML, in which the syntax is defined by XML Schema or the like.

Figures 7A, 7B:
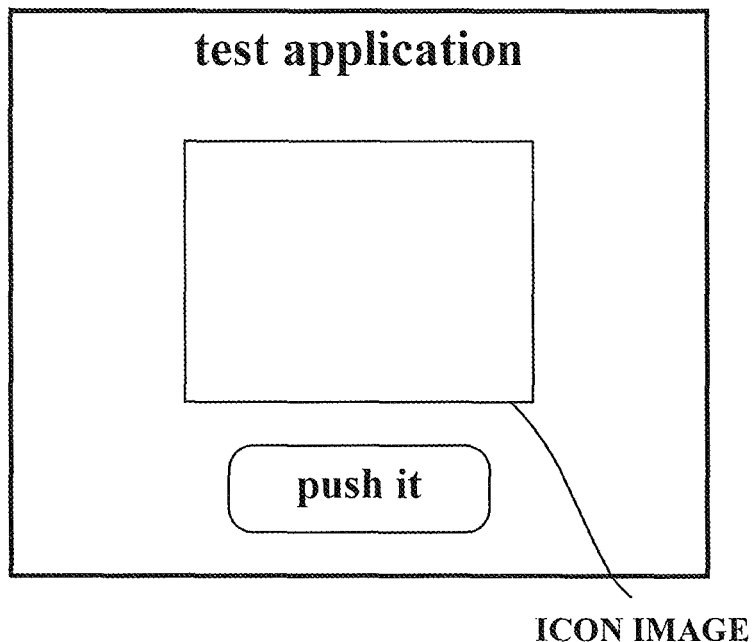
FIG. 7A is a diagram illustrating an example of basic screen data stored in the MFP.
FIG. 7B is a diagram illustrating an example of an operation screen corresponding to the basic screen data.

FIGS. 7A and 7B are diagrams illustrating an example of screen data stored in the MFP 1 and an example of an operation screen corresponding to the screen data, respectively. FIG. 7A is a diagram illustrating an example of the basic screen data 27, and FIG. 7B is a diagram illustrating an example of an operation screen corresponding to the basic screen data 27. The basic screen data 27 is not transmitted to the web browsers 24 and 42 and describes the structure of an operation screen as XML elements. The structure of an operation screen includes titles of terminal-side applications that can be downloaded from the MFP 1 to the terminal apparatus 3, icon images, selection buttons, and the like.

If the terminal apparatus 3 is a personal computer, a web browser with support for a large number of versions of HTML that can be interpreted, cascading style sheets (CSS), and scripts, such as Internet Explorer, Firefox, and Safari, may be used as the web browser 42. In the MFP 1, a web browser for an embedded system may be used as the web browser 24. In the embedded system, the processing capability is lower than that of a personal computer, and the support for the number of versions of HTML, CSS, and script that can be interpreted may be smaller. Also, if the terminal apparatus 3 is a personal computer, the screen size of the display of the operation panel 14 of the MFP 1 is smaller than the screen size of the display 34 of the terminal apparatus 3. For the above-described reasons, if identical screen data is used for the web browsers 42 and 24, an appropriate operation screen will not be displayed on one of the web browsers 42 and 24. In this embodiment, screen data adaptable to the web browser 42 and screen data adaptable to the web browser 24 are generated from the basic screen data 27 and are correspondingly supplied, so that an appropriate operation screen may be displayed on both the web browsers 42 and 24.

Accordingly, the development of the basic screen data 27 eliminates the necessity for separately developing screen data of an operation screen for the operation panel 14 of the MFP 1 and screen data of an operation screen for the terminal apparatus 3. Therefore, the development efficiency of creating the screen data of the operation screen for the operation panel 14 of the MFP 1 and the screen data of the operation screen for the terminal apparatus 3 can be increased.

The present disclosure includes various other embodiments. For example, other designs can be used in which the above-described components are each performed.

In the above-described embodiment, communication based on HTTP is performed between the MFP 1 and the terminal apparatus 3 using the web browser 42 and the web server 25. A communication function similar to that of the web browser and web server may be provided to the applications 44 and 45 and the application 22, and the application 44 or 45 may directly communicate with the application 22 using a communication protocol other than HTTP. In that case, screen data is supplied from the application 22 to the application 44 or 45.

In the above-described embodiment, the converting unit 26 may be included in the application 22. Accordingly, the converting unit 26 can be updated by changing the application 22 in the MFP 1. In addition, the type of HTML that can be generated by the converting unit 26 can be changed. Also, in the above-described embodiment, the converting unit 26 may be installed as an application that operates on the platform 21. In that case, the converting unit 26 can be added and updated by adding and changing the application in the MFP 1, and the type of HTML that can be generated by the converting unit 26 can be changed.

In the above-described embodiment, the converting unit 26 may edit screen data to be transmitted to the web browser 42 of the terminal apparatus 3 on the basis of user agent information indicated by a transmission request in accordance with the type of the web browser specified by the user agent information.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming system comprising:
an image forming apparatus coupled to a network; and
a terminal apparatus coupled to the network,
wherein the terminal apparatus comprises:
a terminal-side web browser configured to transmit a request for first screen data to a web server of the image forming apparatus, receive the first screen data, and cause an operation screen to be displayed on a display of the terminal apparatus on the basis of the received first screen data; and wherein the image forming apparatus comprises:
a converting unit configured to generate HyperText Markup Language (HTML) data of the first screen data and second screen data, wherein the first screen data and the second screen data are generated from basic screen data described in a markup language;
the web server configured to (i) transmit the first screen data for use by the terminal apparatus in response to the request for the first screen data from the terminal apparatus and (ii) transmit the second screen data for use by the image forming apparatus in response to a request for the second screen data from a web browser, wherein the first screen data is different from the second screen data; and
the web browser configured to transmit the request for the second screen data to the web server, receive the second screen data, and cause an operation screen to be displayed on a display of the image forming apparatus on the basis of the received second screen data,
wherein the first screen data and the second screen data include the HTML data and a cascading style sheet applied to the HTML data, and
wherein the converting unit generates HTML data of the first screen data that refers to the cascading style sheet of the first screen data and HTML data of the second screen data that refers to the cascading style sheet of the second screen data.

2. An image forming apparatus that communicates with a terminal apparatus via a network, the image forming apparatus comprising:
a converting unit configured to generate HyperText Markup Language (HTML) data of first screen data and second screen data, wherein the first screen data and the second screen data are generated from basic screen data described in a markup language;
a web server configured to (i) transmit the first screen data for use by the terminal apparatus in response to a request for the first screen data from the terminal apparatus and (ii) transmit the second screen data for use by the image forming apparatus in response to a request for the second screen data from a web browser, wherein the first screen data is different from the second screen data; and
the web browser configured to transmit the request for the second screen data to the web server, receive the second screen data, and cause an operation screen to be displayed on a display of the image forming apparatus on the basis of the received second screen data,
wherein the first screen data and the second screen data include the HTML data and a cascading style sheet applied to the HTML data, and
wherein the converting unit generates HTML data of the first screen data that refers to the cascading style sheet of the first screen data, and generates HTML data of the second screen data that refers to the cascading style sheet of the second screen data.

3. The image forming apparatus according to claim 2, further comprising:
a Java virtual machine,
wherein the converting unit is included in a conversion application installed in the Java virtual machine or a conversion application formed on the Java virtual machine.

4. The image forming apparatus according to claim 1, wherein a type of a terminal-side web browser at the terminal apparatus and a type of the web browser at the image forming apparatus are specified by a URL used as a destination of the respective requests for the first and second screen data.

5. The image forming apparatus according to claim 1, wherein a type of a terminal-side web browser at the terminal apparatus and a type of the web browser at the image forming apparatus are specified by user agent information included in the respective requests for the first and second screen data.

6. An image forming apparatus that communicates with a terminal apparatus via a network, the image forming apparatus comprising:
a web server configured to (i) transmit first screen data for use by the terminal apparatus in response to a request for the first screen data from the terminal apparatus and (ii) transmit second screen data for use by the image forming apparatus in response to a request for the second screen data from a web browser, the first screen data being different from the second screen data, and both the first screen data and second screen data being generated from basic screen data;
the web browser configured to transmit the request for the second screen data to the web server, receive the second screen data, and cause an operation screen to be displayed on a display of the image forming apparatus on the basis of the received second screen data;
a storage device configured to store (i) a first application program for execution at the terminal apparatus and (ii) a second application program for execution at the image forming apparatus; and
a controller configured to execute an operation specified by a process execution instruction of the second application,
wherein the web server transmits the first application program to the terminal apparatus in response to a request for the first application program from the terminal apparatus,
wherein the first application is configured to cause a terminal-side web browser to display a second operation screen on a display of the terminal apparatus on the basis of the first screen data,
wherein the basic screen data describes a structure of the second operation screen including a title, an icon image, and a selection button, as XML elements,
wherein, when the selection button on the second operation screen are pressed, the terminal-side web browser specifies a URL of a further terminal-side application program corresponding to the selection button and transmits a request for the further terminal-side application program to the web server,
wherein the further terminal-side application program is a Java application program executed on a terminal-side Java virtual machine and a native program, and
wherein the Java application communicates with the second application via the terminal-side web browser using Hypertext Transfer Protocol (HTTP), and the native program communicates with the controller of the image forming apparatus via the terminal-side web browser using a Web Services Description Language (WSDL).

7. The image forming apparatus according to claim 6, wherein the second application is configured to communicate with the first application via the terminal-side web browser, and wherein when receiving a process execution instruction corresponding to a user operation detected by an input device of the terminal apparatus from the first application, the second application causes the controller to execute a process specified by the process execution instruction.

8. The image forming apparatus according to claim 6, wherein the second application causes the web browser to display the operation screen on the display of the image forming apparatus on the basis of the second screen data.

9. The image forming apparatus according to claim 6, further comprising:
a Java virtual machine,
wherein the second application is formed on the Java virtual machine.

10. The image forming apparatus according to claim 6, wherein the further terminal-side application program is a Java application program executed on a terminal-side Java virtual machine and a native program.

11. The image forming apparatus according to claim 2, wherein the terminal apparatus is one of a personal computer and a mobile terminal apparatus.

12. An image forming method comprising:
generating, via an image forming apparatus, HyperText Markup Language (HTML) data of first screen data and second screen data, wherein the first screen data and the second screen data are generated from basic screen data described in a markup language;
transmitting, via a terminal-side web browser of a terminal apparatus coupled to a network, a request for the second screen data to a web server of the image forming apparatus coupled to the network;
transmitting, via the web server of the image forming apparatus, the second screen data to the terminal-side web browser in response to the request for the second screen data, the second screen data being generated for the terminal-side web browser from basic screen data;
receiving, via the terminal-side web browser, the second screen data, and causing an operation screen to be displayed on a display of the terminal apparatus on the basis of the received the second screen data;
transmitting, via a web browser of the image forming apparatus, a request for the first screen data to the web server of the image forming apparatus;
transmitting, via the web server of the image forming apparatus, the first screen data to the web browser of the image forming apparatus in response to the request for the first screen data, the first screen data being generated for the web browser of the image forming apparatus from the basic screen data; and
receiving, via the web browser of the image forming apparatus, the first screen data, and causing a second operation screen to be displayed on a display of the image forming apparatus on the basis of the received first screen data;
wherein the first screen data and the second screen data include the HTML data and a cascading style sheet applied to the HTML data, and
wherein HTML data of the first screen data is generated by referring to the cascading style sheet of the first screen data and HTML data of the second screen data is generated by referring to the cascading style sheet of the second screen data.

13. The image forming method according to claim 12, further comprising:
storing, via a storage device of the image forming apparatus, a program of a terminal-side application for the terminal apparatus;
transmitting, via the web server of the image forming apparatus, the program of the terminal-side application to the terminal apparatus in response to a request for the program of the terminal-side application from the terminal apparatus; and communicating, via an application of the image forming apparatus, with the terminal-side application, and receiving a process execution instruction corresponding to a user operation detected by an input device of the terminal apparatus from the terminal-side application, and causing a controller of the image forming apparatus to execute a process specified by the process execution instruction.

* * * * *